United States Patent Office 3,380,811
Patented Apr. 30, 1968

3,380,811
PHOSPHORAMIDIC DIFLUORIDE AND
METHOD OF PREPARATION
William C. Preusse, Naperville, Ill., assignor to Olin
Mathieson Chemical Corporation, New Haven, Conn.,
a corporation of Virginia
No Drawing. Filed Aug. 26, 1963, Ser. No. 304,636
4 Claims. (Cl. 23—357)

ABSTRACT OF THE DISCLOSURE

Phosphoramidic difluoride is provided in high quality and good yield by the reaction of pyrophosphoryl tetrafluoride and ammonia.

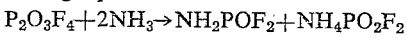

This application relates to phosphoramidic difluoride and to a novel process for the preparation of this compound.

It has been reported in French Patent 807,769, that dialkylaminophosphorfluorides can be prepared by causing dialkylaminophosphoric compounds having at least one halogen atom replaceable by fluorine to react with compounds such as potassium fluoride and antimony trifluoride. Also, Kovache et al. have reported in Chemie and Industrie 64, 287–99 (1950), that dialkylaminophosphorfluorides can be prepared in 40% yield by treating RR′NPOCl$_2$ with two moles of sodium fluoride wherein R and R′ are alkyl groups. However, the preparation of the parent compound phosphoramidic difluoride having the formula NH$_2$POF$_2$ has not been previously reported.

Therefore, the principal object of this invention was to prepare the aforementioned phosphoramidic difluoride. Another object of this invention was to provide a direct and efficient process for the preparation of this derivative. Still another object of this invention was to provide a heretofore unknown phosphorus- and fluorine-containing compound suitable for imparting flame-retardant properties to cellulosic fabrics.

The above objects have been accomplished in accordance with this invention. It has been found that phosphoramidic difluoride can be obtained in high quality and good yield by the reaction of pyrophosphoryl-tetrafluoride with ammonia. The difluoride is useful as a flame-retarding agent on cellulosic fabrics. An efficient process for the preparation of the phosphoramidic difluoride is herein provided. The difluoride is prepared in accordance with the following equation:

$$P_2O_3F_4 + 2NH_3 \rightarrow NH_2POF_2 + NH_4PO_2F_2$$

The beginning reactant, P$_2$O$_3$F$_4$, can be prepared by the reaction of difluorophosphoric acid and phosphoric anhydride as described by E. A. Robinson in the Canadian Journal of Chemistry, 40, 1729 (1962).

The preparation of the phosphoramidic difluoride can be accomplished in the absence of a solvent wherein ammonia is slowly introduced into pyrophosphoryltetrafluoride. However, the reaction is exothermic, and the preferred process embodiment utilizes an inert organic solvent, thus allowing better control of the reaction. In addition, the use of a solvent facilitates the removal of the ammonium difluorophosphate formed in the process since it may be readily removed from the reaction mixture by filtration. Suitable organic solvents which may be used in the process include ether, acetonitrile, trichlorofluoromethane and the like.

Although a molar excess of ammonia may be used if so desired, it has been found that no particular advantage is obtained as a result of such excess. Therefore, for economic reasons, it is preferred to utilize a stoichiometric amount of ammonia in the process, i.e., two moles for each mole of P$_2$O$_3$F$_4$.

The reaction can be performed at temperatures up to the boiling point of P$_2$O$_3$F$_4$ which is about 70° C. However, in view of the exothermic nature of the reaction, it has been found that it is preferable to prepare the phosphoramidic difluoride by the process disclosed herein whereby a reaction temperature of less than about 10° C. is employed.

The following example will serve to illustrate the process of this invention wherein the difluoride is obtained.

EXAMPLE 1

Freshly prepared pyrophosphoryltetrafluoride, 107.0 g. (0.57 mole), was added to approximately 400 cc. of anhydrous ether in a three-necked flask equipped with stirrer and inlet tubes for nitrogen and ammonia. The flask had previously been thoroughly dried and was blanketed with dry nitrogen while the reactants were added. The reaction vessel was packed in Dry Ice, and 19.0 g. (1.14 mole) of anhydrous ammonia gas was bubbled below the surface of the ether solution while the solution was stirred vigorously. After the ammonia was added over a two hour period, the reaction mixture was allowed to warm up to room temperature. Ammonium difluorophosphate solid was then filtered from the reaction mixture, and the ether filtrate was placed in a distillation still. After removing the ether, a high boiling fraction of 30.0 g. of a colorless liquid having a boiling point of 69° C./0.18 mm. was obtained. The following analytical data revealed that phosphoramidic difluoride had been obtained. Yield: 52%.

Analysis.—Calcd. for NH$_2$POF$_2$: N, 13.9; P, 30.7; F, 37.6. Found: N, 14.2; P, 30.1; F, 37.9.

Further identification of the compound was made by infrared and nuclear magnetic resonance analyses.

As mentioned in the foregoing discussion, it has been found that phosphoramidic difluoride has utility as a flame retarding agent on cellulosic fabrics. For example, this utility may be shown in the following manner. An 80 x 80 cotton print cloth weighing 4.0 g. was placed in a flat dish, and 100 ml. of a 1% acetone solution of phosphoramidic difluoride was poured into the dish thus covering the cloth. The solvent was evaporated in air at ambient temperature until the cloth was dry. A weighing indicated that the dry cloth contained slightly less than 25% of phosphoramidic difluoride based on the dry weight of the fabric. The cloth was supported in a vertical position, and an open flame was placed in direct contact with the lower end of the cloth for approximately fifteen seconds. The treated cloth did not propagate the flame, and there was no afterglow when the flame was removed from the cloth. Furthermore, there was only a very small charred area on the treated cloth. When a similar piece of cotton print cloth which was untreated with phosphoramidic difluoride was subjected to the same treatment, it was completely consumed by fire in a short period.

Since the hydrogen atoms in the amido group of the phosphoramidic difluoride are very labile, this compound also possesses special utility as a reactive intermediate in contrast to dialkylaminophosphorfluorides. As an example of this reactivity, NH$_2$POF$_2$ can be reacted with sulfur tetrafluoride (SF$_4$) in accordance with the procedure disclosed in Angewandte Chemie 75, 207 (1963) to yield F$_2$S=NPOF$_2$, a compound which is an effective insecticide. This reaction cannot be carried out with the dialkylaminophosphorfluorides.

What is claimed is:
1. A process for preparing phosphoramidic difluoride which comprises reacting pyrophosphoryltetrafluoride with ammonia at a temperature up to about 70° C.
2. The process of claim 1 wherein an inert organic solvent is utilized.

3. A process for preparing phosphoramidic difluoride which comprises reacting pyrophosphoryltetrafluoride with ammonia in an inert organic solvent at a temperature of up to about 10° C.

4. A process for preparing phosphoramidic difluoride which comprises reacting pyrophosphoryltetrafluoride with ammonia in an inert organic solvent at a temperature of up to about 10° C., removing ammonium difluorophosphate from the reaction mixture, and recovering the said difluoride.

References Cited

UNITED STATES PATENTS

| | | | |
|---|---|---|---|
| 2,498,174 | 2/1950 | Morris | 167—17 X |
| 3,096,371 | 7/1963 | Olah et al. | 23—357 |
| 3,231,327 | 1/1966 | Seglin et al. | 23—357 |

OTHER REFERENCES

Kovache et al.: "Chimie et Industrie," vol. 64, pp. 287–299 (1950).

MILTON WEISSMAN, *Primary Examiner.*